United States Patent
Heinen

(10) Patent No.: US 9,247,385 B1
(45) Date of Patent: Jan. 26, 2016

(54) SYSTEM AND METHOD FOR DETERMINING VISIBILITY OF GEOTAGGED CONTENT

(71) Applicant: Google Inc., Mountain View, CA (US)

(72) Inventor: Niels Johannes Heinen, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/064,066

(22) Filed: Oct. 25, 2013

Related U.S. Application Data

(62) Division of application No. 13/461,703, filed on May 1, 2012, now Pat. No. 8,594,706.

(51) Int. Cl.
*H04W 24/00* (2009.01)
*H04W 4/02* (2009.01)

(52) U.S. Cl.
CPC ..................... *H04W 4/021* (2013.01)

(58) Field of Classification Search
CPC .................................................. H04W 4/021
USPC ............. 455/456.1–456.3, 414.1–414.2, 457; 707/748, 754, 763, 769
See application file for complete search history.

(56) References Cited

U.S. PATENT DOCUMENTS

| | | | |
|---|---|---|---|
| 2011/0130112 A1* | 6/2011 | Saigh et al. | 455/404.1 |
| 2011/0287811 A1 | 11/2011 | Mattila et al. | |
| 2012/0047147 A1 | 2/2012 | Redstone et al. | |
| 2012/0100870 A1 | 4/2012 | Prost et al. | |
| 2012/0194547 A1* | 8/2012 | Johnson et al. | 345/632 |
| 2013/0222364 A1* | 8/2013 | Kraus et al. | 345/419 |

\* cited by examiner

*Primary Examiner* — Wayne Cai
(74) *Attorney, Agent, or Firm* — Dority & Manning, P.A.

(57) ABSTRACT

A system and method for providing information corresponding to a set of geotagged content is provided. A location of a user operated mobile device is determined and mapping information of a target area associated with the location of the user operated mobile device is retrieved. Information corresponding to a several geotagged content in the target area is further retrieved. A visibility of each of the several geotagged content from the location of the user operated mobile device is determined based on the location of the user operated mobile device, the mapping information of the target area, and the retrieved information corresponding to several geotagged content in the target area. Information corresponding to a set of the several geotagged content determined to be visible from the location of the user is provided.

9 Claims, 5 Drawing Sheets

SYSTEM AND METHOD FOR DETERMINING VISIBILITY OF GEOTAGGED CONTENT

RELATED APPLICATION

This application is a divisional of U.S. patent application Ser. No. 13/461,703, filed on May 1, 2012, entitled "SYSTEM AND METHOD FOR DETERMINING VISIBILITY OF GEOTAGGED CONTENT," the contents of which are herein incorporated by reference in its entirety.

FIELD

This disclosure generally relates to determining visibility of geotagged points of interest, and, in particular, to providing information to a user on geotagged points of interest determined to be visible from the user's perspective.

BACKGROUND

Individuals in transit often utilize mapping applications to identify geotagged points of interest around their locations or along planned routes. Mapping applications generally provide information regarding points of interest within the vicinity of a user's locations.

SUMMARY

The disclosed subject matter relates to a computer-implemented method for providing information corresponding to a set of geotagged content. A location of a user operated mobile device is determined and mapping information of a target area associated with the location of the user operated mobile device is retrieved. Information corresponding to a several geotagged content in the target area is further retrieved. A visibility of each of the several geotagged content from the location of the user operated mobile device is determined based on the location of the user operated mobile device, the mapping information of the target area, and the retrieved information corresponding to several geotagged content in the target area. Information corresponding to a set of the several geotagged content determined to be visible from the location of the user is provided.

According to various aspects of the subject technology, a system for providing information corresponding to a set of geotagged content is provided. The system includes one or more processors and a machine-readable medium comprising instructions stored therein, which when executed by the processors, cause the processors to perform operations comprising retrieving location updates of a user operated mobile device. A direction of travel of the user operated mobile device is determined based on the location updates. An orientation of the user operated mobile device is identified, and the direction of travel is associated with the identified orientation of the user operated mobile device. Mapping information of a target area associated with a location of the user operated mobile device and information corresponding to several geotagged content in the target area are retrieved. A visibility of each of the several geotagged content from the location of the user operated mobile device is determined based on the orientation of the user operated mobile device associated with the direction of travel, the mapping information of the target area, and the retrieved information corresponding to several geotagged content in the target area. Information corresponding to a set of the several geotagged content determined to be visible from the location of the user is provided.

The disclosed subject matter also relates to a machine-readable medium comprising instructions stored therein, which when executed by a system, cause the system to perform operations comprising retrieving location updates of a user operated mobile device. A direction of travel of the user operated mobile device is determined based on the location updates. Mapping information of a target area associated with a location of the user operated mobile device and information corresponding to several geotagged content in the target area are retrieved. A visibility of each of the several geotagged content from the location of the user operated mobile device is determined based on the determined direction of travel of the user operated mobile device, the mapping information of the target area, and the retrieved information corresponding to several geotagged content in the target area. Information corresponding to a set of the several geotagged content determined to be visible from the location of the user is provided.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Mapping applications generally provide information regarding points of interest within the vicinity of a user's locations. Certain points of interest shown on the mapping applications to be within the vicinity of the user may not be visible to the user from the user's location and perspective. Conversely, other points of interest that may not be shown by the mapping applications to be in the vicinity of the user may nonetheless be visible to the user from the user's location and perspective. Thus, it may be desirable to implement a system that provides information corresponding geotagged points of interest that are determined to be visible from the location and perspective of the user.

The disclosed subject matter relates to a computer-implemented method for providing information corresponding to a set of geotagged content. A location of a user operated mobile device is determined and mapping information of a target area associated with the location of the user operated mobile device is retrieved. Information corresponding to a several geotagged content in the target area is further retrieved. A visibility of each of the several geotagged content from the location of the user operated mobile device is determined based on the location of the user operated mobile device, the mapping information of the target area, and the retrieved information corresponding to several geotagged content in the target area. Information corresponding to a set of the several geotagged content determined to be visible from the location of the user is provided.

Figure 1:
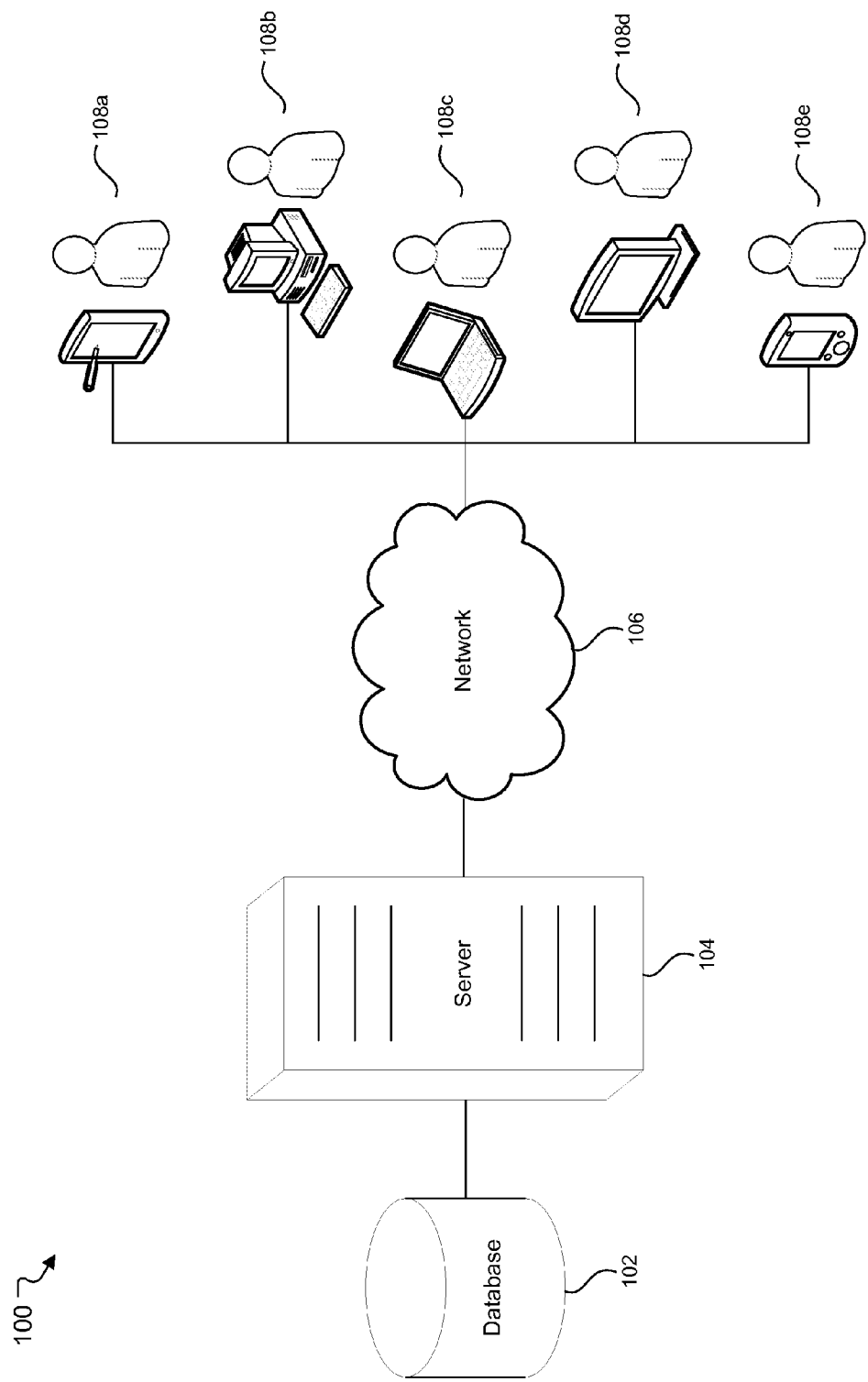
FIG. 1 illustrates an example network environment which provides for determining the visibility of geotagged points of interest from a user's perspective.

FIG. 1 illustrates an example network environment which provides for determining the visibility of geotagged points of interest from a user's perspective. Network environment 100 comprises one or more databases 102 (e.g., computer-readable storage devices) for storing a variety of data accessed by web-based applications. The network environment 100 further comprises one or more servers 104. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from database 102, process the set of data, and serve a set of information to client devices 108a-108e.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Each of client devices 108a-108e may be any machine configured to generate and transmit a signal that includes location information (e.g., GPS coordinates) to server 104. In some aspects, client devices 108a-108e may include one or more client applications (e.g., mapping applications, GPS applications, or other processes) configured to generate and transmit GPS signals to a server. The GPS signals may include GPS coordinates (e.g., longitude and latitude coordinates) and, in some cases, a time stamp indicating when the GPS signal was generated.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
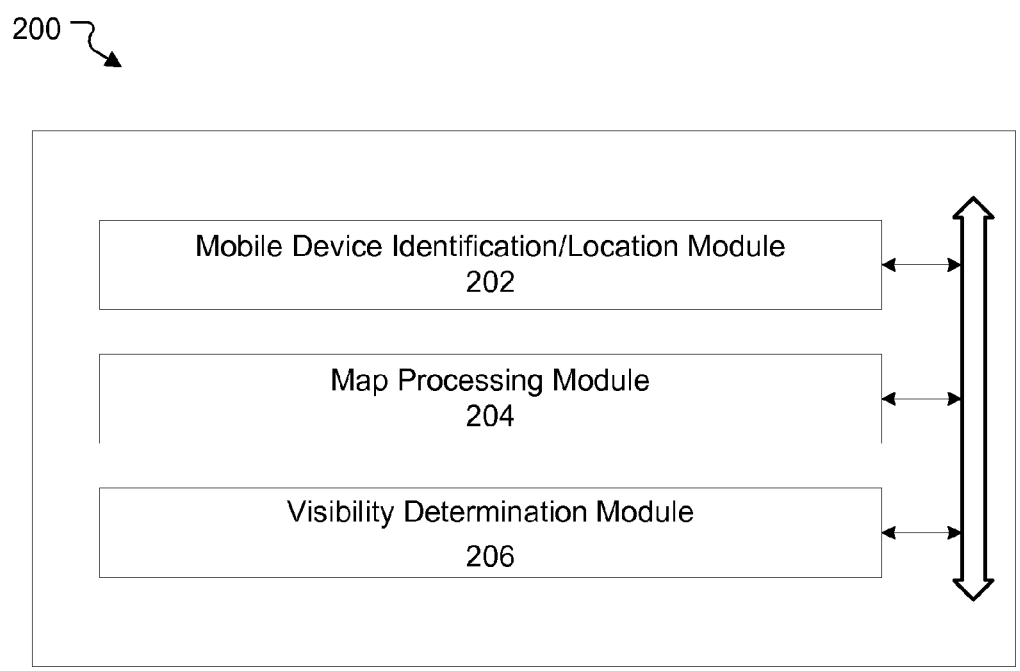
FIG. 2 illustrates an example of a server system for determining the visibility of geotagged points of interest from a user's perspective.

FIG. 2 illustrates an example of a server system for determining the visibility of geotagged points of interest from a user's perspective. System 200 includes mobile device identification/location module 202, map processing module 204, and visibility determination module 206. These modules, which are in communication with one another, process information retrieved from database 102 in order to determine the visibility of geotagged points of interest from the perspective of a user operated device. For example, a mobile device operated by a user may be identified and located by mobile device identification/location module 202. Furthermore, queries may be received by map processing module 204 from a mapping application operating on the mobile device. Map processing module 204 may determine geotagged landmarks within the vicinity of the user operated mobile device. Upon determining the geotagged landmarks, visibility determination module 206 may determine whether each of the geotagged landmarks is visible from the location and perspective of the user operated mobile device. The geotagged landmarks determined to be visible may then be sent to the user operated mobile device.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
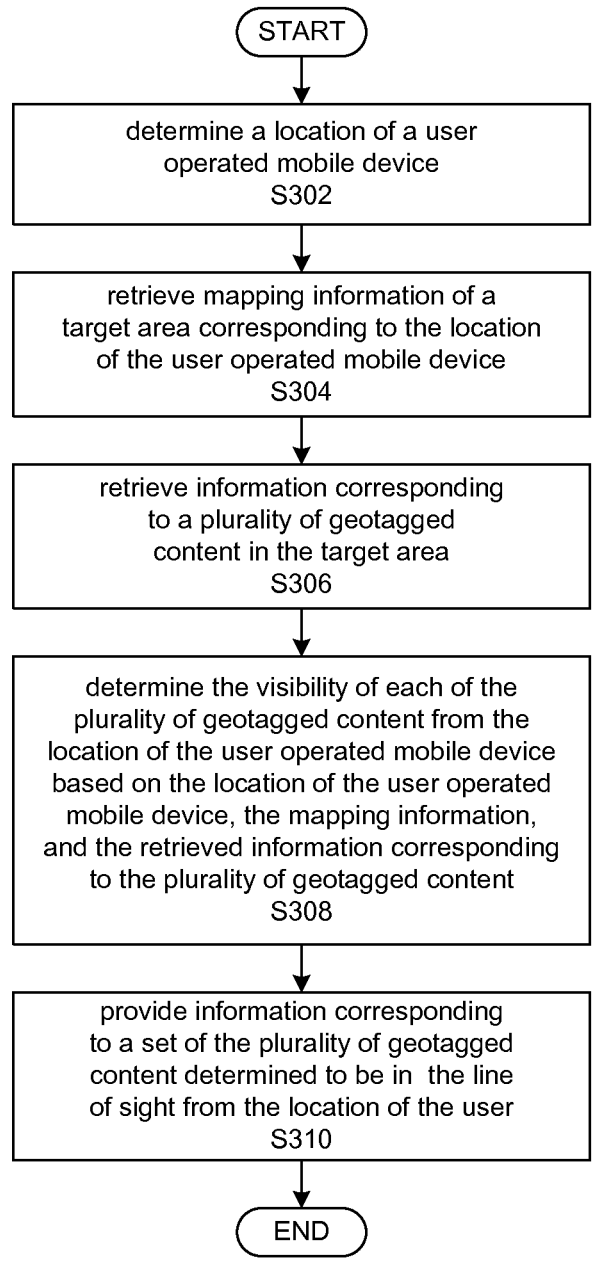
FIG. 3 illustrates an example method for determining the visibility of geotagged points of interest from a user's perspective.

FIG. 3 illustrates example method 300 for determining the visibility of geotagged points of interest from a user's perspective. The determination of the visibility of the geotagged points of interest may be performed on a mapping application running on a user operated mobile device. A location of the user operated mobile device is determined, according to S302. Mapping information of a target area corresponding to the determined location of the user operated mobile device is retrieved, according to S304. Mapping information may include roads and road labels as well as geotagged points of interest. Mapping information may further include a topography of the target area as well as location and height information of man-made structures such as buildings.

Information corresponding to the geotagged points of interest may be retrieved, according to S306. The retrieved information (i.e., geotag) may identify points of interest such as monuments, museums, airports, restaurants, hotels, etc., in the area. The retrieved information may also identify natural landmarks such as mountains, lakes, rivers, etc. For each of the several geotagged content for which information is retrieved, a determination may be made as to whether each of the several geotagged content is visible from the location and perspective of the user operated mobile device, according to S308. The determination is made based on the location of the user operated mobile device, the mapping information, and the retrieved information corresponding to the plurality of geotagged content.

In some implementations, a location of a point of interest may also be included in the retrieved information associated with the point of interest. For example, a location of the Washington Monument in Washington D.C. may be included as global positioning system (GPS) coordinates of 38° 53' North latitude and 77° 2' West longitude derived from the geotag associated with the Washington Monument. The geotag may also provide information such as the dimensions (length, width, and height) of the Washington Monument, as well as the elevation of the land on which the monument stands. The visibility of the point of interest may be determined from the location and dimensions information. For example, the distance at which the monument is visible may be determined based on the width and height of the Washington Monument. That is, the farther the structure is away from the viewer, the taller and wider the structure must be to be visible.

The determination whether the geotagged content is visible or not is further based on the location of the user operated mobile device. The location of the user operated mobile device may be determined as GPS coordinates. In addition to longitude and latitude, the GPS coordinates may also provide an altitude for the user operated mobile device. The location of the user operated mobile device may also be determined based on the location of a Wi-Fi network to which the user operated mobile device may be connected. The location of the user operated mobile device may further be determined based on the location of a cellular network to which the user operated mobile device may be connected.

In some implementations, the location of the user operated mobile device may be entered manually. The manual entry may be used when GPS signals or a connection to a Wi-Fi network is unavailable. The manual entry may also be used to override the location determined via GPS or a Wi-Fi network. A user may enter an address which includes a number, a street, a city, a state or province, and a country. Alternatively, the user may manually enter longitude and latitude values for GPS coordinates. The location that the user enters may correspond to a current location of the user. The location may also correspond to a location for which the user would like to obtain information. In this example, the visibility of geotagged content may be determined in reference to the location manually entered by the user.

Returning to the above example, the Washington Monument, at 555 feet tall, may be visible from approximately 30 miles away in the ideal conditions. Thus, a user operated mobile device determined to be 30 miles or less from the monument may be determined to have a view of the monument, assuming there are no obstructions to the line of sight. Terrain information may also be used to determine the visibility of the geotagged content. For example, a point of interest sitting at a higher elevation (e.g., on a hill) and/or a user operated mobile device located at a higher elevation (e.g., located on the top floor of a tall building) may increase the visibility of the point of interest from the location of the user operated mobile device. Conversely, if either the point of interest of the user operated mobile device is located at a lower elevation (e.g., in a valley), the visibility of the point of interest from the location of the user operated mobile device may be decreased.

In order to more accurately determine the visibility of geotagged content, the effect of intervening structures between the user operated mobile device and the geotagged content may be determined. Intervening structures may be identified as structures that are located along the line of sight between the user operated mobile device and the geotagged content. Intervening structures may include natural structures (hills, land formations, etc.) and man-made structures (buildings, towers, statutes, etc.). Once an intervening structure is identified, the height and width of the structure may be obtained to determine whether the intervening structure obstructs the line of sight. In some implementations, the height and width of the structure may be obtained from the web-based mapping application. Certain mapping applications may provide such information from depth maps used by the application to render 3D images of the target area. Using such information provided by mapping applications, an obstruction to the line of sight between the user operated mobile device and the geotagged content may be identified by determining whether the intervening structure occupies a space between the user operated mobile device and the geotagged content.

Figure 4:
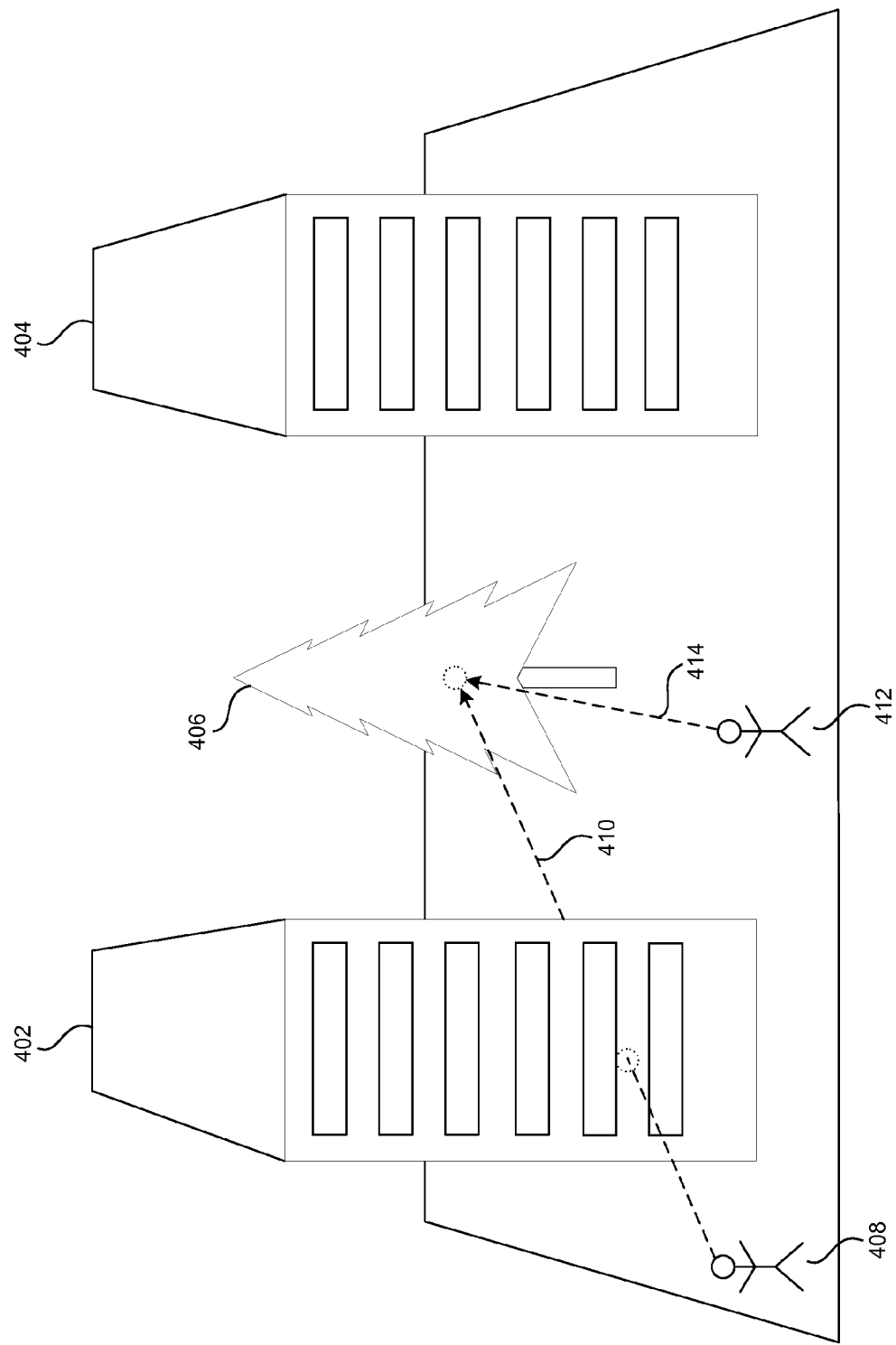
FIG. 4 illustrates an example of the visibility of a geotagged landmark from two different user perspectives.

FIG. 4 illustrates an example of the visibility of a geotagged landmark from two different user perspectives. The target area includes first building 402 and second building 404, each located adjacent to geotagged landmark 406. First spectator 408 has s first line of sight 410 to geotagged landmark 406, and second spectator 412 has a second line of sight 414 to geotagged landmark 406. As shown in the figure, first line of sight 410 of first spectator 408 is obstructed by first building 402. Thus, landmark 406 is not visible to first spectator 408 in this example. Second spectator 412, on the other hand, has a second line of sight 414 to landmark 406. Second line of sight 414 is not obstructed by any physical structures. thus, landmark 406 may be determined as being entirely visible to second spectator 412. Accordingly, the determination of visibility may be made based on the location of the user operated mobile device, the location of the geotagged point of interest, the retrieved information (i.e., the dimensions) corresponding to the geotagged content, and the identification of intervening structures located along the line of sight between the user operated mobile device and the geotagged content.

In some implementations, additional conditions are analyzed to determine visibility of geotagged content. One such condition may include the time of day. By identifying a time of day, a determination of the amount of daylight available for viewing a geotagged content such as the Washington Monument may be made. The monument may be most visible during the middle of the day when the most amount of daylight is available. The visibility may me compromised during low light conditions that exist between dusk of one day and dawn of the next day. Weather is an additional condition that may contribute to determining visibility. Weather events such as rain, snow, or fog may diminish visibility, regardless of the time of day or the amount of daylight available. Accordingly, the visibility of geotagged content may further be determined based on an amount daylight and weather reports.

In some implementations, mobile devices may provide heading information associated with a direction for the user operating the mobile device. A mobile device such as a cellular phone may include a compass that provides heading information as well as an indication of the orientation of the phone. An anticipated direction of travel may be predicted from the heading information, location updates, and the orientation of the mobile device. The anticipated direction of travel may be use to provide a direction from which a field of vision may be based. For example, if the user operating the mobile device is walking on a street, a heading as well as a speed may be determined based on the location updates. A field of vision that indicates what is visible to the user may also be associated with the determined heading.

The heading may further be associated with an orientation of the mobile device. If the mobile device is kept in the pocket of a user walking down a street, the determined heading of travel may be associated with an orientation of the phone. Once an association has been made between the heading and the orientation of the phone, any changes in the orientation of the mobile device may indicate a change in the heading as well the direction of the field of vision. Thus, if the user walking down the street makes a left turn, a change of heading in the compass in relation to the orientation of the phone may indicate the turn made by the user. The field of vision of the user may be shifted according to the indicated left turn.

A direction of travel and a speed of travel may be predicted based on the above determined information on the heading, location updates, and orientation of the mobile device. For example, if the user of the mobile device is determined to be traveling south on a highway at 60 miles per hour, a prediction may be made that the user will continue on the highway at a similar speed of travel. With this information, the mapping application operating on the mobile device may anticipate any points of interests that will become visible to the user along the predicted path of travel. As discussed above, several factors such weather conditions, lighting conditions, and intervening structures may contribute to the determination of the visibility of the points of interests.

In some implementations, the speed of travel may also contribute to the determination of visibility. A user of the mobile device traveling at a higher speed will be determined to have lower visibility of points of interest, particularly those points of interest determined to be located along the peripherals of the field of vision corresponding to the heading of travel. That is, the field of vision of the user may be decreased as speed is increased. For example, a user may be determined to have a field of vision of 150° when stationary, but only 60° when traveling at 60 miles per hour. Thus, the user traveling down the highway at 60 miles per hour may be prompted to a point of interest by the mapping application if that point of interest is within the 60° field of vision. In other words, any points of interest outside of the visible field of vision corresponding to the speed at which the user is traveling may be filtered out since those points of interest will not be visible to the user.

In some implementations, the points of interest provided by the mapping application may be based on content type. For example, the mapping application may keep a history of places that a user often visits, or ratings of businesses and/or attractions provided by the user. Places that the user often visits and businesses and attractions with high ratings by the user may have priority when being displayed on the mapping application. Additionally, in cases where the mobile device is in standby mode, the determination that a point of interest is visible from a current location of the user may cause a prompt (e.g., audible/visible signal, vibration, etc.) to be sent to the user as an indication of the visibility of the point of interest. In addition to the prompt, a textual description associated with the point of interest may be provided. The user may further provide in the settings of the mobile device the types of points of interest for which the user would like to be prompted.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
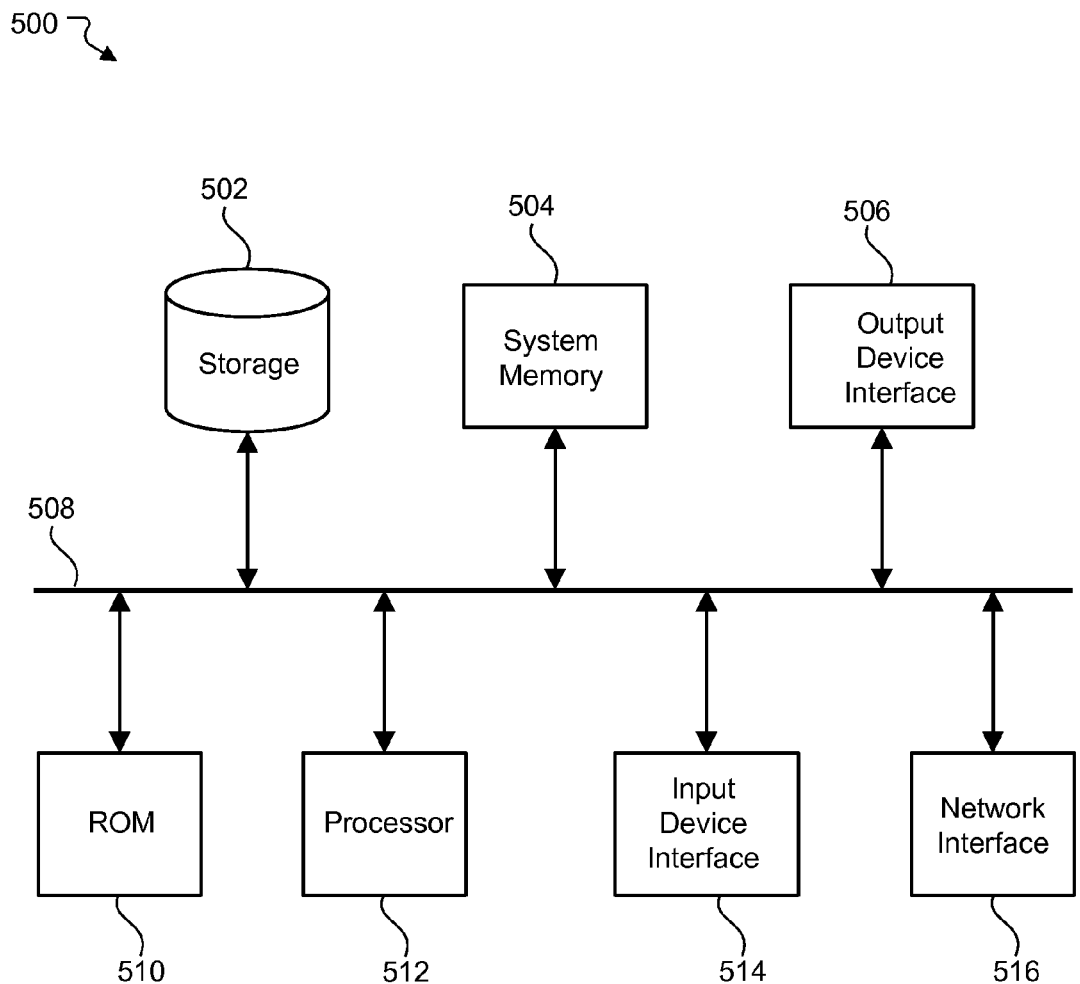
FIG. 5 conceptually illustrates an example electronic system with which some implementations of the subject technology are implemented.

FIG. 5 conceptually illustrates an example electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for determining the visibility of geotagged content from the perspective of a user in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-readable medium comprising instructions stored therein, which when executed by a system, cause the system to perform operations comprising:
   retrieving location updates of a user operated mobile device;
   determining a direction of travel and a speed of travel of the user operated mobile device based on the location updates;
   retrieving mapping information of a target area associated with a location of the user operated mobile device;
   retrieving information corresponding to a plurality of geotagged content in the target area;
   determining a visibility of each of the plurality of geotagged content from the location of the user operated mobile device based on the determined direction of travel of the user operated mobile device, the mapping information of the target area, and the retrieved information corresponding to a plurality of geotagged content in the target area, wherein determining the visibility of each of the plurality of geotagged content from the location of the user operated mobile device comprises associating a field of vision with the direction of travel of the user operated mobile device, and wherein the field of vision is determined based on the speed of travel, the field of vision being reduced as the speed of travel is increased; and
   providing information corresponding to a set of the plurality of geotagged content determined to be visible from the location of the user.

2. The machine-readable medium of claim 1, wherein the field of vision comprises an angle, and wherein the angle of the field of vision represents an angle of deviation from the determined direction of travel at which objects are determined to be visible.

3. The machine-readable medium of claim 1, wherein a set of the plurality of geotagged content are determined to be visible from the location of the user when the set of the plurality of geotagged content are within the field of vision associated with the determined direction of travel.

4. The machine-readable medium of claim 1, wherein the determining the visibility of each of the plurality of geotagged content from the location of the user operated mobile device is further based on at least one of weather condition and lighting condition.

5. The machine-readable medium of claim 1, wherein a set of the plurality of geotagged content are determined to be visible from the location of the user when the set of the plurality of geotagged content are within the field of vision associated with the determined direction of travel.

6. A system for providing information corresponding to a set of geotagged content, the system comprising:
   one or more processors; and
   a machine-readable medium comprising instructions stored therein, which when executed by the processors, cause the processors to perform operations comprising:
      retrieving location updates of a user operated mobile device;
      determining a direction of travel and a speed of travel of the user operated mobile device based on the location updates;
      identify an orientation of the user operated mobile device;
      associating the direction of travel with the identified orientation of the user operated mobile device;

retrieving mapping information of a target area associated with a location of the user operated mobile device;

retrieving information corresponding to a plurality of geotagged content in the target area;

determining a visibility of each of the plurality of geotagged content from the location of the user operated mobile device based on the orientation of the user operated mobile device associated with the direction of travel, the mapping information of the target area, and the retrieved information corresponding to a plurality of geotagged content in the target area, wherein the machine-readable medium further comprises instructions for associating a field of vision with the determined direction of travel of the user operated mobile device, and wherein the field of vision is determined based on the speed of travel, the field of vision being reduced as the speed of travel is increased; and providing information corresponding to a set of the plurality of geotagged content determined to be visible from the location of the user.

7. The system of claim 6, wherein the direction of travel of the user operated mobile device is determined based on a reading of a compass operating on the user operated mobile device.

8. The system of claim 6, wherein a change in the orientation of the user operated mobile device causes a change in the direction of travel on which the determination of the visibility of each of the plurality of geotagged content is based.

9. The system of claim 6, wherein a set of the plurality of geotagged content are determined to be visible from the location of the user when the set of the plurality of geotagged content are within the field of vision associated with the determined direction of travel.

* * * * *